United States Patent [19] [11] Patent Number: 4,650,332
Muraoka et al. [45] Date of Patent: Mar. 17, 1987

[54] OPTICAL POSITION DETECTING APPARATUS FOR POSITIONING AN ACTUATOR

[75] Inventors: Koji Muraoka, Hachioji; Takeshi Maeda, Kokubunji; Masahiro Takasago; Tokuya Kaneda, both of Odawara, all of Japan

[73] Assignee: Hitachi, Ltd., Tokyo, Japan

[21] Appl. No.: 718,278

[22] Filed: Apr. 1, 1985

[30] Foreign Application Priority Data

Mar. 30, 1984 [JP] Japan ................................. 59-60673

[51] Int. Cl.⁴ .......................... G01B 11/14; G01J 1/32
[52] U.S. Cl. .................................. 356/374; 250/205; 250/237 G
[58] Field of Search ...................... 33/125 A, 125 C; 250/205, 237 G; 356/374

[56] References Cited

U.S. PATENT DOCUMENTS 3,597,750 8/1971 Brunner et al. ............... 340/174.1 C
4,385,836 5/1983 Schmitt ............................ 356/374
4,472,629 9/1984 Ort .................................. 250/237 G
4,523,089 6/1985 Maeda et al. ....................... 250/205

FOREIGN PATENT DOCUMENTS 0620808 5/1974 U.S.S.R. ......................... 250/237 G

Primary Examiner—Eugene R. LaRoche
Assistant Examiner—James C. Lee
Attorney, Agent, or Firm—Antonelli, Terry & Wands

[57] ABSTRACT

In an optical position detecting apparatus using moire, two light receiving elements are associated with a single light emitting element, and moire or grating portions of an auxiliary moire i.e., fixed sub-scale opposing the respective light receiving elements are arranged such that detection signals produced from the two light receiving elements upon movement of a movable moire i.e., main scale are substantially 180° out of phase. The difference between the detection signals from the light receiving elements is used as a positioning signal, and the sum of the detection signals from the light receiving elements is used as a signal for controlling the input of the light emitting element.

15 Claims, 6 Drawing Figures

FIG. 1
FIG. 2
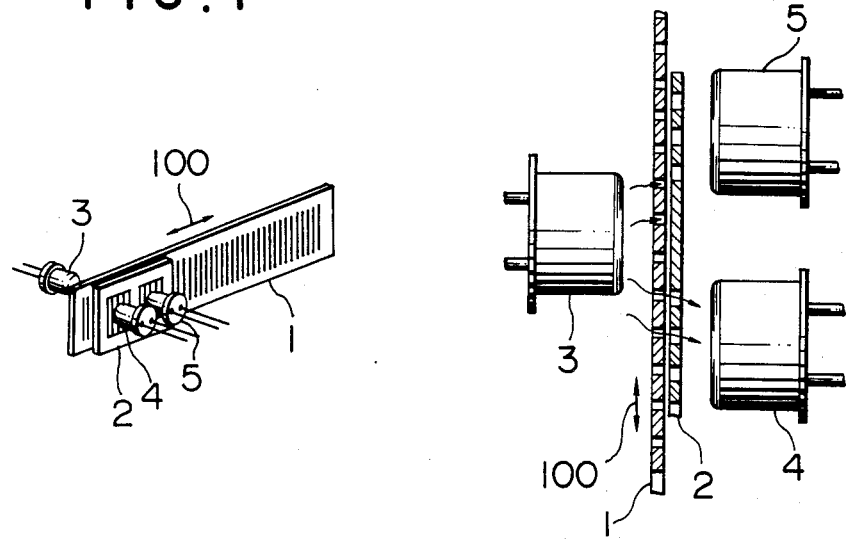
FIG. 3
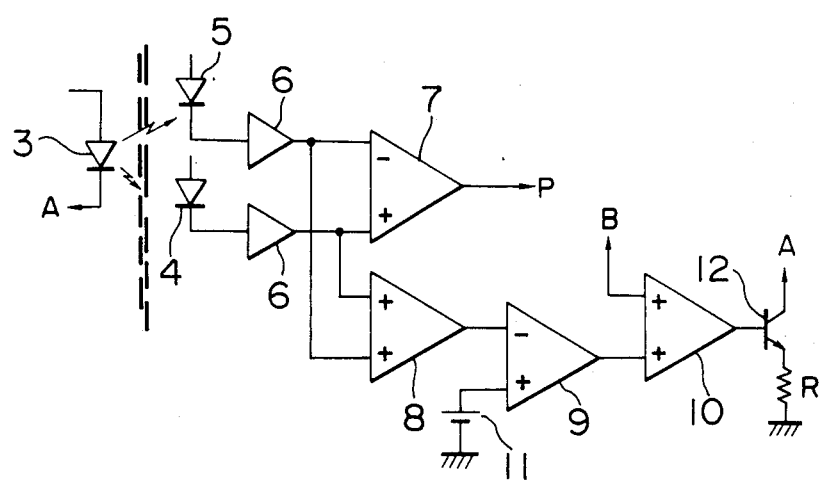

OPTICAL POSITION DETECTING APPARATUS FOR POSITIONING AN ACTUATOR

BACKGROUND OF THE INVENTION

This invention relates to an optical position detecting apparatus and more particularly a position detecting apparatus using moire suitable for determination of the position or positioning of a linear actuator which moves linearly with high precision.

In a prior art position detecting apparatus using moire, intensity of light emitting from a light emitted element changes with temperature changes and the output of a light receiving element changes with variations in the output of a power supply and as a result, the bias point of a positioning signal changes, thus degrading accuracies of positioning or making positioning invalid.

SUMMARY OF THE INVENTION

An object of this invention is to provide a position detecting apparatus which is easy to construct and which can constantly provide a stable detection signal by suppressing variations in the detection signal due to changes in ambient temperature.

Variations in the detection signal of the position detecting apparatus using moire are mainly due to an error in mounting a movable moire, i.e., movable main scale and a variation in power of emission light caused by ambient temperature change and power supply voltage variation. The first cause can be eliminated by mounting the movable main scale with high accuracies. The second cause can be eliminated by using a stabilized power source immersed in a constant temperature bath only at the cost of an increased size and expensiveness of the apparatus. Even with the above expedients, temperature changes due to heat generated in the light emitting element per se are unavoidable. Under the circumstances, this invention features an electrical circuit which can correct signal variations. More specifically, this invention uses an optical position detecting apparatus comprising a single light emitting element and two light receiving elements associated therewith. Slit or grating portions of an auxiliary moire i.e., a fixed sub-scale corresponding to the respective light receiving elements are arranged such that detection signals from the light receiving elements are 180° out of phase with respect to each other, the difference between the detection signals from the light receiving elements is used as a positioning signal, and the sum of the detection signals from the light receiving elements is used as a signal for controlling the input of the light emitting element.

Proposed in U.S. Pat. No. 3,597,750 is an example of an electrical circuit which can correct the influence of effects of drift and variations in power upon the positioning signal. This prior art technique, however, uses a pair of light emitting elements corresponding to a pair of light receiving elements and practically, it is very difficult to eliminate the adverse effect of changes in intensity of light emission from the light emitting elements caused by temperature changes. To be specific, in this prior art, a sum signal of output signals from the paired light receiving elements is compared with a reference voltage to detect an error signal, and a difference signal between the output signals from the paired light receiving elements is detected and fedback to a power supply for the light emitting elements so that the difference signal is so shared by the two light receiving elements as to make constant the sum of amplitudes of the output signals from the paired light receiving elements and keep equal gains of the paired light receiving elements. In general, however, the respective paired light emitting elements have different light emission output characteristics versus drive currents, and the light emission output characteristics differently depend on temperature changes with the result that correcting changes in intensity of emission light due to temperature changes and maintaining equality of gains of both the light receiving elements for their output signals are difficult to achieve.

In view of the above, according to this invention, a single light emitting element is used as a light source, and a pair of light receiving elements are so arranged as to receive substantially uniformly light emitted from the light emitting element. In this invention, the light emitting element must be arranged in relation to the light receiving elements with high accuracies on the one hand, and the use of the single light emitting element as the light source on the other hand is essential in order that the influence of changes in intensity of emission light from the light emitting element caused by temperature changes and variations in the power supply output upon the positioning signal can be corrected through the use of an electrical circuit.

The inventors of this application have thoroughly studied the prior art position detecting techniques from the viewpoint of practical applications to find serious shortcomings involved. The present invention then intends to eliminate the shortcomings encountered in the prior art techniques as applied to practical applications and advantageously ensures that the quantity of received light can constantly be controlled to a fixed level by using a simplified construction so that variations in the position detection signal due to changes in quantity of light from the light emitting element caused by heat generated therein, changes in ambient temperature and variations in the power supply voltage can be minimized to improve the stability of positioning control based on moire scales.

BRIEF DESCRIPTION OF THE DRAWINGS

FIG. 1 is a perspective view of a position detector according to an embodiment of the invention;

FIG. 2 is a plan view of the position detector;

FIG. 3 is a circuit diagram of a signal detection circuit according to the invention;

DESCRIPTION OF THE PREFERRED EMBODIMENTS

Figure 4:
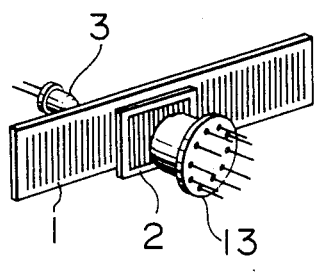
FIG. 4 is a perspective view of a position detector using a four-divided light receiving element according to another embodiment of the invention.

The invention will now be described by way of example with reference to the drawings. Referring to FIG. 1, a position detector of a position detecting apparatus embodying the invention comprises a movable moire or movable main scale 1 attached to a linear actuator or the like (not shown) which moves linearly, an auxiliary moire or fixed sub-scale 2 so configured as to provide at its right and left moire or grating portions detection signals which are 180° out of phase to each other, a single light emitting element 3, and a pair of light receiving elements 4 and 5. The movable main scale 1 is positionally related to the fixed sub-scale 2 such that slits or gratings of the movable main scale are parallel to those of the fixed sub-scale and both the scales are substantially in intimate contact with each other with a slight gap left therebetween. The light receiving elements 4 and 5 are disposed in front of the fixed sub-scale 2 to oppose the left and right moire portions, respectively. The light emitting element 3 is substantially equidistant from the two light receiving elements 4 and 5 and is also arranged so as to permit delivery of outputs from the light receiving elements 4 and 5 which are equally maximized in level.

The positional relationship in FIG. 1 is illustrated in plan view form in FIG. 2. As will be seen from FIG. 2, when the slits in one (left) of the moire portions of the fixed sub-scale 2 exactly overlap some slits of the movable main scale 1, light emitted from the light emitting element 3 reaches the light receiving element 4 and an output is produced from the light receiving element 4. Concurrently, slits in the other (right) of the moire portions of the fixed sub-scale 2 are staggered relative to some slits of the movable main scale 1 to intercept the light and no output is produced from the light receiving element 5. Thus, as the movable main scale 1 moves, the output of the light receiving element 4 takes a sine waveform and concurrently, the output of the light receiving element 5 takes a sine waveform which is 180° out of phase. The light receiving elements 4 and 5 are opposed as closely as possible to ensure that light from the light emitting element 3 of light converging type such as an ultrared light emitting diode can be received efficiently. Since the light receiving elements 4 and 5 must be in mutual positional relationship which permits reception of the same quantity of light and the exact phase displacement of 180°, they are gauged in a precisely fabricated unitary block so as to simplify the necessary positional adjustment and their assembling.

FIG. 3 shows a circuit for stabilizing the position detection signal. Light emitted from the light emitting element 3 passes through the slits of both the movable main scale 1 and fixed sub-scale 2, reaching the light receiving elements 4 and 5. Outputs produced from the light receiving elements 4 and 5 in accordance with quantities of incident light are fed via amplifiers 6 to a differential amplifier 7 which in turn produces a difference signal P used as a positioning signal. The difference signal P is shaped into pulses and these pulses are counted by a counter (not shown) to measure an amount of movement of the movable main scale. Because of the output signals of the light receiving elements 4 and 5 of 180° phase relationship, the thus obtained difference signal doubles apparent sensitivity to thereby facilitate positioning.

The outputs of the light receiving elements 4 and 5 are also fed via the amplifiers 6 to an adder 8 at which they are added together. A resultant sum provides a DC signal because of the 180° phase relationship of the output signals of the light receiving elements 4 and 5. For example, when the quantity of emission light from the light emitting element 3 varies with a variation in temperature with consequent corresponding variations in the quantities of light received by the two light receiving elements, the output of the adder 8 varies in DC level. This varying DC signal is compared with a DC signal 11 at a differential amplifier 9 to readily detect an error signal corresponding to the change in the quantity of light. This error signal is added with a bias signal B for the light emitting element 3 at an adder 10 which in turn produces a resultant sum output coupled to a base of a transistor 12 having its emitted grounded via a resistor R and its collector connected to the light emitting element. The transistor 12 responsive to the sum signal controls drive current for the light emitting element 3 such that the quantity of light emitted from the light emitting element 3 can constantly be fixed.

According to this embodiment, therefore, the position detection signal P can constantly be stabilized to realize a highly accurate position detecting apparatus.

Figure 5:
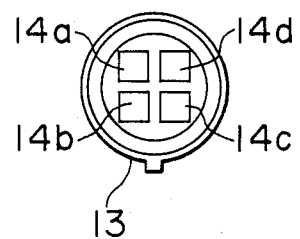
FIG. 5 is a plan view of the four-divided light receiving element.

The paired light receiving elements 4 and 5 in the previous embodiment may be replaced with a four-divided light receiving element 13 as shown in FIGS. 4 and 5. The four-divided light receiving element 13 has four light receiving planes or parts 14a, 14b, 14c and 14d. The light receiving parts 14a and 14b are combined together for detection of a signal, and the light receiving parts 14c and 14d are also combined together similarly. Thus, a sum signal of outputs from the light receiving parts 14a and 14b is used as such an output signal of the light receiving element 4 and a sum signal of outputs from the light receiving parts 14c and 14d is used as such an output signal of the light receiving element 5. In this modification, the center line between the moire portions of the fixed subscale is aligned with the vertical center line dividing the two sets of light receiving parts. This modification advantageously facilitates mounting and handling of the light receiving elements since the two sets of the light receiving parts are built in a single package.

Figure 6:
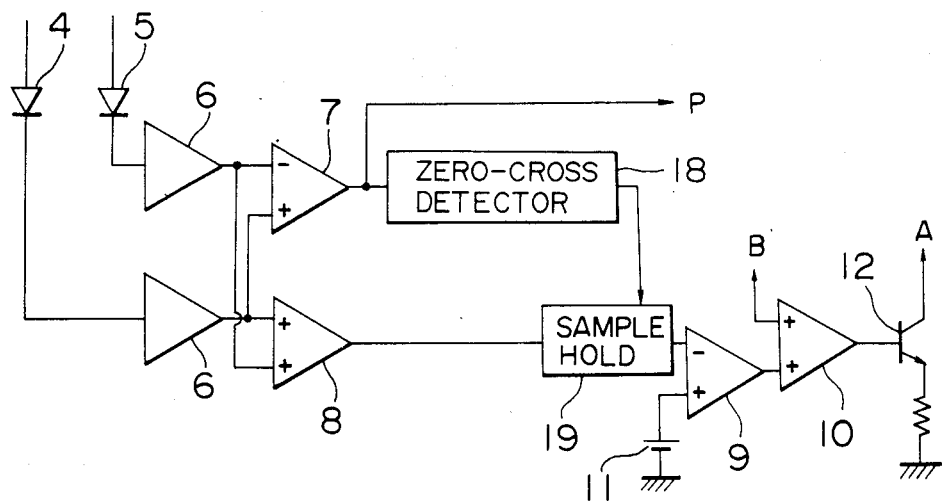
FIG. 6 is a circuit diagram of another signal detection circuit according to the invention.

FIG. 6 shows another embodiment of the signal detection circuit. Signals of 180° phase relationship are detected by the light receiving elements 4 and 5 and passed through amplifiers 6 so as to be fed to a differential amplifier 7 and an adder 8. An output signal of the differential amplifier 7 is used on the one hand as a position signal 7 and is on the other hand fed to a zero-cross detector 18. An output signal from the adder 8 is applied to a sample hold circuit 19 at which it is held by a signal from the zero-cross detector 18. An output signal from the sample hold circuit 19 is compared with a reference signal 11 at a differential amplifier 9 which in turn produces an error signal. The error signal is added with a bias signal B for the light emitting element at an adder 10 and a resultant sum signal is fedback to an input A of the light emitting element through a transistor 12. Since in this embodiment the sum signal of the outputs of the two light receiving elements are held at the zero-cross point of the signal P having an expanded amplitude, the feedback to the light emitting element in compliance with temperature changes can advantageously be effected with high accuracies even in the event that the output signals from the two light receiving elements are not exactly 180° out of phase. In addition, it is not necessary that mounting of the light receiving elements be precisely adjusted to establish the strict 180° phase displacement, thereby simplifying the required adjustment.

We claim:

1. An optical position detecting apparatus using moire comprising:
    a single light emitting element;
    light detecting means including first and second light receiving elements arranged to substantially uniformly receive light emitted from said light emitting element;

a movable grating and a fixed grating interposed between said light emitting element and said light detecting means, said fixed grating including a first grating portion associated with said first light receiving element, and a second grating portion associated with said second light receiving element and being substantially 180° out of phase with respect to said first grating portion;

signal detecting means for detecting a variation in a sum signal of output signals from said first and second light receiving elements;

control means responsive to an output signal of said detecting means for controlling the light output of said light emitting element;

means for producing a difference signal between the output signals of said first and second light receiving elements, said difference signal being used as a positioning signal; and means for detecting the zero-cross point of the difference signal between the output signals from said first and second light receiving elements, said detecting means including a sample hold circuit responsive to an output signal of said zero-cross detecting means for holding the sum signal of the output signals from said first and second light receiving elements.

2. The apparatus according to claim 1, wherein said light detecting means comprises a single light receiving element divided into four light receiving parts by two axes which are substantially orthogonal to each other, with first and second light receiving parts on one side of one of the orthogonal axes opposed to said first grating portion and with third and fourth light receiving parts on the other side opposed to said second grating portion, and a sum signal of output signals from said first and second light receiving parts is used as the output signal of said first light receiving element and a sum signal of output signals from said third and fourth light receiving parts is used as the output signal of said second light receiving element.

3. The apparatus according to claim 1, wherein said signal detecting means comprises an adder for receiving the output signals from said first and second light receiving elements and applying a resultant sum signal to said sample hold circuit, and a differential amplifier for comparing an output signal of said sample hold circuit with a reference signal and producing a resultant difference signal.

4. The apparatus according to claim 1, wherein said light emitting element comprises an ultrared light emitting diode.

5. The apparatus according to claim 1, wherein said control means comprises an adder for adding the output signal of said signal detecting means and a bias signal for said light emitting element, and a control circuit responsive to an output signal of said adder for controlling a drive current for said light emitting element.

6. The apparatus according to claim 5, wherein said control circuit comprises a transistor having its base applied with the output signal of said adder, its emitter grounded via a resistor and its collector connected to said light emitting element.

7. An optical position detecting apparatus using moire comprising:

a single light emitting element;

light detecting means including first and second light receiving elements arranged to substantially uniformly receive light emitted from said light emitting element;

a movable grating and a fixed grating interposed between said light emitting element and said light detecting means, said fixed grating including a first grating portion associated with said first light receiving element, and a second grating portion associated with said second light receiving element and being substantially 180° out of phase with respect to said first grating portion;

signal detecting means for detecting a variation in a sum signal of output signals from said first and second light receiving elements;

control means responsive to an output signal of said detecting means for controlling the light output of said light emitting element; and means for producing a difference signal between the output signals of said first and second light receiving elements, said difference signal being used as a positioning signal; said signal detecting means including and adder for receiving the output signals from said first and second light receiving elements, and a differential amplifier for comparing an output signal of said adder with a reference signal and producing a resultant difference signal.

8. The apparatus according to claim 7, wherein said light detecting means comprises a single light receiving element divided into four light receiving parts by two axes which are substantially orthogonal to each other, with first and second light receiving part on one side of one of the orthogonal axes opposed to said first grating portion and with third and fourth light receiving parts on the other side opposed to said second grating portion, and a sum signal of output signals from said first and second light receiving parts is used as the output signal of said first light receiving element and a sum signal of output signals from said third and fourth light receiving parts is used as the output signal of said second light receiving element.

9. The apparatus according to claim 7, wherein said light emitting element comprises an ultrared light emitting diode.

10. The apparatus according to claim 7, wherein said control means comprises an adder for adding the output signal of said signal detecting means and a bias signal for said light emitting element, and a control circuit responsive to an output signal of said adder for controlling a drive current for said light emitting element.

11. The apparatus according to claim 10, wherein said control circuit comprises a transistor having its base applied with the output signal of said adder, its emitter grounded via a resistor and its collector connected to said light emitting element.

12. An optical position detecting apparatus using moire comprising:

a single light emitting element;

light detecting means including first and second light receiving elements arranged to substantially uniformly receive light emitted from said light emitting element;

a movable grating and a fixed grating interposed between said light emitting element and said light detecting means, said fixed grating including a first grating portion associated with said first light receiving element, and a second grating portion associated with said second light receiving element and being substantially 180° out of phase with respect to said first grating portion;

signal detecting means for detecting a variation in a sum signal of output signals from said first and second light receiving elements;

control means responsive to an output signal of said detecting means for controlling the light output of said light emitting element; and means for producing a difference signal between the output signals of said first and second light receiving elements, said difference signal being used as a positioning signal; said control means including an adder for adding the output signal of said signal detecting means and a bias signal for said light emitting element, and a control circuit responsive to an output signal of said adder for controlling a drive current for said light emitting element.

13. The apparatus according to claim 12, wherein said control circuit comprises a transistor having its base applied with the output signal of said adder, its emitter grounded via a resistor and its collector connected to said light emitting element.

14. The apparatus according to claim 12, wherein said light detecting means comprises a single light receiving element divided into four light receiving parts by two axes which are substantially orthogonal to each other, with first and second light receiving parts on one said of one of the orthogonal axes opposed to said first grating portion and with third and fourth light receiving parts on the other side opposed to said second grating portion, and a sum signal of output signals from said first and second light receiving parts is used as the output signal of said first light receiving element and a sum signal of output signals from said third and fourth light receiving parts is used as the output signal of said second light receiving element.

15. The apparatus according to claim 12, wherein said light emitting element comprises an ultrared light emitting diode.

* * * * *